(12) United States Patent
Liu et al.

(10) Patent No.: US 10,896,461 B2
(45) Date of Patent: Jan. 19, 2021

(54) METHOD AND APPARATUS FOR DATA MINING BASED ON USERS' SEARCH BEHAVIOR

(71) Applicant: BEIJING BAIDU NETCOM SCIENCE AND TECHNOLOGY CO., LTD., Beijing (CN)

(72) Inventors: Cheng Liu, Beijing (CN); Jun Yang, Beijing (CN); Yunfei Jia, Beijing (CN); Chi Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 536 days.

(21) Appl. No.: 14/902,306

(22) PCT Filed: Jun. 25, 2014

(86) PCT No.: PCT/CN2014/080757
§ 371 (c)(1),
(2) Date: Dec. 30, 2015

(87) PCT Pub. No.: WO2015/196397
PCT Pub. Date: Dec. 30, 2015

(65) Prior Publication Data
US 2017/0109816 A1 Apr. 20, 2017

(51) Int. Cl.
*G06Q 40/02* (2012.01)
*G06F 16/2457* (2019.01)
(Continued)

(52) U.S. Cl.
CPC ............ *G06Q 40/02* (2013.01); *G06F 16/00* (2019.01); *G06F 16/2457* (2019.01);
(Continued)

(58) Field of Classification Search
None
See application file for complete search history.

(56) References Cited

U.S. PATENT DOCUMENTS 6,981,040 B1 12/2005 Konig et al.
8,442,973 B2* 5/2013 Cramer ............... G06F 16/9535
707/723
(Continued)

FOREIGN PATENT DOCUMENTS

CN 1967579 A 5/2007
CN 101420313 A 4/2009
(Continued)

OTHER PUBLICATIONS

Jia Tina Du and Amanda Spink, Toward a web search model: Integrating multitasking, cognitive coordination, and cognitive shifts (Year: 2001).*
(Continued)

*Primary Examiner* — Akosua Kyereme-Tuah
(74) *Attorney, Agent, or Firm* — Lathrop GPM LLP

(57) ABSTRACT

A method for performing data mining based on search behavior of a user is provided. One embodiment includes acquiring search behavior information of users; determining financial instruments corresponding to search behavior of the user and determining user attention information corresponding to each of the determined financial instruments. Another embodiment includes acquiring search behavior information of users; determining financial need related characteristics of the users; and grouping the users into user groups according to the determined financial need related characteristics; and determining a financial instrument corresponding to each of the user groups by matching the financial need related characteristic of each of the user groups with instrument characteristics of financial instruments. By implementing the methods, accurate and objec-
(Continued)

tive data support can be provided for financial institutions to provide financial instruments that meet user needs and financial instruments that meet the users' actual needs can be provided.

17 Claims, 6 Drawing Sheets

(51) Int. Cl.
*G06F 16/2458* (2019.01)
*G06F 16/00* (2019.01)
*G06F 16/9535* (2019.01)
*G06F 16/951* (2019.01)
*G06Q 30/02* (2012.01)

(52) U.S. Cl.
CPC ........ *G06F 16/2465* (2019.01); *G06F 16/951* (2019.01); *G06F 16/9535* (2019.01); *G06Q 30/0204* (2013.01); *G06F 2216/03* (2013.01)

(56) References Cited

U.S. PATENT DOCUMENTS

| | | | | |
|---|---|---|---|---|
| 8,630,937 | B1* | 1/2014 | Zerenner | G06Q 40/04 705/36 R |
| 2007/0260597 | A1* | 11/2007 | Cramer | G06Q 30/0244 |
| 2008/0281808 | A1 | 11/2008 | Anderson et al. | |
| 2010/0082434 | A1* | 4/2010 | Chen | G06Q 30/0257 705/14.55 |
| 2010/0312764 | A1* | 12/2010 | Liao | G06F 16/338 707/723 |
| 2011/0137913 | A1* | 6/2011 | Bhatti | G06Q 40/06 707/741 |
| 2014/0172564 | A1* | 6/2014 | Alon | G06Q 50/01 705/14.54 |
| 2015/0012403 | A1* | 1/2015 | Buck | G06F 3/013 705/37 |

FOREIGN PATENT DOCUMENTS

| | | |
|---|---|---|
| CN | 102063453 A | 5/2011 |
| CN | 102354385 A | 2/2012 |
| CN | 103020843 A | 4/2013 |
| CN | 103399883 A | 11/2013 |
| CN | 103473354 A | 12/2013 |
| CN | 103778553 A | 5/2014 |
| JP | 2004185220 A | 7/2004 |
| JP | 2012203821 A | 10/2012 |
| JP | 2013131009 A | 7/2013 |
| JP | 2013149140 A | 8/2013 |

OTHER PUBLICATIONS

Translation of the International Search Report corresponding to International Patent Application No. PCT/CN2014/080757, dated Mar. 30, 2015, 2 pages.
Ashyralyyev, S. et al., Incorporating the Surving Behavior of Web Users into PageRank, CIKM '13 Proceedings of the 22nd ACM international conference on Information & Knowledge Management, (2013) pp. 2351-2356.

* cited by examiner

METHOD AND APPARATUS FOR DATA MINING BASED ON USERS' SEARCH BEHAVIOR

CROSS REFERENCE TO RELATED APPLICATIONS

This application is a 371 National Phase of International Application No. PCT/CN2014/080757 filed Jun. 25, 2014, the entire content of which is incorporated by reference in its entirety.

TECHNICAL FIELD

The present invention relates to the field of data analysis, and particularly to a method for performing data mining based on search behavior of a user.

BACKGROUND

Mining of big data is the leading edge technology that is much in need of further development. How to mine and analyze behavior data of a large number of users, especially search behavior of mass users, to determine needs of the users is an acute problem to be solved in the computer field.

SUMMARY

An objective of the present invention is to provide a method for performing data mining based on search behavior of a user.

According to one aspect of the present invention, a method for financial data mining is provided, where the method includes the following steps:

acquiring search behavior information of a plurality of users; and determining, based on the search behavior information of the plurality of users, financial instruments corresponding to search behavior of the plurality of users;

wherein the method further includes:

determining, based on the determined financial instruments corresponding to each search behavior of the plurality of users, user attention information corresponding to each of the determined financial instruments.

According to another aspect of the present invention, a method for providing financial instrument information to users is provided, where the method includes:

acquiring search behavior information of a plurality of users;

determining financial need related characteristics of the users based on the search behavior information of the plurality of users; and grouping the plurality of users into a plurality of user groups according to the determined financial need related characteristics of the users, wherein each of the user groups has a corresponding financial need related characteristic;

wherein the method further includes:

determining a financial instrument corresponding to each of the user groups by matching the financial need related characteristic of each of the user groups with instrument characteristics of a plurality of financial instruments.

According to another aspect of the present invention, an apparatus for financial data mining is provided, which includes:

an apparatus configured to acquire search behavior information of a plurality of users; and an apparatus configured to determine, based on the search behavior information of the plurality of users, financial instruments corresponding to search behavior of the plurality of users;

where the apparatus further includes:

an apparatus configured to determine, based on the determined financial instrument corresponding to each search behavior of the plurality of users, user attention information corresponding to each of the determined financial instruments.

According to another aspect of the present invention, an apparatus for providing financial instrument information to users, which includes:

an apparatus configured to acquire search behavior information of a plurality of users;

an apparatus configured to determine financial need related characteristics of the users based on the search behavior information of the plurality of users;

an apparatus configured to group the plurality of users into a plurality of user groups according to the determined financial need related characteristics of the users, where each of the user groups has a financial need related characteristic; and an apparatus configured to determine a financial instrument corresponding to each of the user groups by matching the financial need related characteristic of each of the user groups with instrument characteristics of a plurality of financial instruments.

As compared with the prior art, the present invention mines search behavior of the user data to obtain financial instrument information that is of interest to users, to provide accurate and objective data support to financial institutions through the provision of financial instruments that meet user needs, and to provide the users with financial instruments that meet their actual needs.

BRIEF DESCRIPTION OF THE DRAWINGS

Other features, objectives and advantages of the present invention will become more apparent from the detailed description of non-limiting embodiments that is provided with reference to the following accompanying drawings.

Like or similar reference numerals in the accompanying drawings denote like parts.

DETAILED DESCRIPTION OF EMBODIMENTS

The present invention is described in further detail below with reference to the accompanying drawings.

TERM DEFINITIONS

"Financial institution" refers to financial service related institutions or enterprises, such as banks, financial intermediaries (such as securities traders and financial services companies), investment institutions (such as publicly offered funds and privately offered funds), insurance companies, and financial leasing institutions.

"Financial instrument" refers to particular financial products or financial information, such as information of bank financial products, stock information of listed companies in the secondary market, and certain insurance products of insurance companies.

"User equipment" refers to a terminal device used by a user, including, but not limited to, a personal computer (PC), a tablet computer, a smart phone, a personal digital assistance (PDA), and an Internet Protocol television (IPTV).

"Network device" refers to a computer device that is connected to a network and that can send or receive information over the network, including, but not limited to, a single network server, a server group consisting of a plurality of network servers, and a cloud formed by a large number of computers or network servers based on cloud computing. Cloud computing is a type of distributed computing, where a group of loosely coupled computer clusters form a super virtual computer.

"Network" refers to a network that connects different computer devices and provides data transmission, including, but not limited to, the Internet, a wide area network, a metropolitan area network, a local area network, and a virtual private network (VPN).

It will be appreciated by those skilled in the art that the foregoing user equipment, network devices and networks are listed by way of example only, and any computing device or network applicable to the present invention, whether it is currently available or will be available in the future, shall fall within the protection scope of the present invention, and are incorporated herein by reference.

Figure 1:
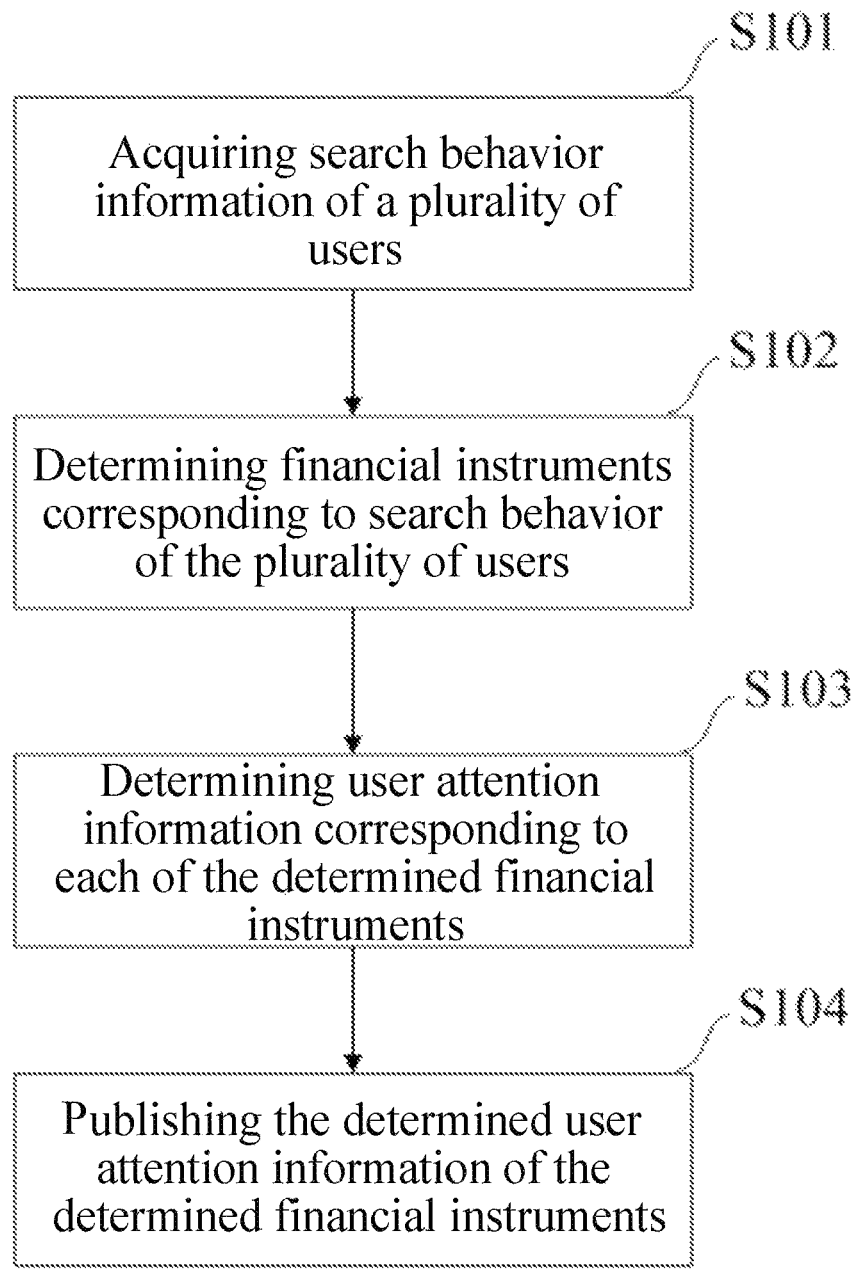
FIG. 1 is a flowchart of a method for performing data mining based on search behavior of the user to determine information regarding user attention to financial instruments according to an embodiment of the present invention.

FIG. 1 is a flowchart of a method for performing data mining based on search behavior of the user to determine information regarding user attention to financial instruments according to an embodiment of the present invention.

This embodiment is described below with reference to FIG. 1.

As shown in FIG. 1, at step S101, a network device 2 acquires search behavior information of a plurality of users.

The search behavior information of the plurality of users includes at least one of the following: a query sequence of each user, operation information such as click and access by each user on a search result obtained in response to the query sequence, and the page that each user accesses after clicking the search result.

The search behavior information may be acquired in advance by the network device or other network devices that interact with each user equipment, and stored in a storage device. The network device accesses the storage device to read the search behavior information of the plurality of users. The storage device may be integrated with the network device or independent of the network device.

At step S102, the network device determines, based on the search behavior information of the plurality of users, financial instruments corresponding to the search behavior of the plurality of users.

Specifically, for each search behavior of each of the plurality of users, the network device 2 may determine the financial instrument corresponding to the search behavior by analyzing the query sequence of each user, the operation such as click and access by each user on one or more search results provided in response to the query sequence, and/or the page that each user accesses after clicking the search result.

Then, at step S103, the network device determines, based on the determined financial instrument corresponding to each search behavior of the plurality of users, user attention information corresponding to each of the determined financial instruments. The user attention information includes, but not limited to, at least one of the following: the total number of times the user pays attention, the number of times the user pays attention within a period of time or the user attention frequency, and a time dependent user attention frequency curve.

Specifically, the network device may collect statistics based on the determination results for each user search behavior at step S102, so as to obtain the user attention information corresponding to the financial instruments that are determined at step S102.

Optionally, at step S104, the network device may publish over a network, on various information publishing platforms such as websites, BBS, WeChat groups, and microblogs, the user attention information corresponding to each of the financial instruments that is determined at step S103, or provide the user attention information to a financial institution for further data analysis or for generating other financial information.

In a preferred embodiment, at step S102, the network device determines, based on the search behavior information of the plurality of users, the financial instrument corresponding to each search behavior of the plurality of users having a financial need. A description is provided below through two examples.

Example 1

At step S1021 (not shown), the network device 2 determines, by performing an initial need analysis of the search behavior information of the plurality of users, the search behavior of the plurality of users having a financial need.

The step of determining, by performing initial need analysis of the search behavior information of the plurality of users, the search behavior of the plurality of users having a financial need includes at least one of the following modes:

1) Performing semantic analysis of the query sequence in each search behavior of the plurality of users, to determine whether the search behavior has a financial need.

Specifically, when it is found that the query sequence contains certain keywords whose meanings are related to a financial need, it can be determined that the search behavior has the financial need; or a first financial need value D1 may be determined according to the number and/or the levels of such keywords whose meanings are related to the financial need.

2) Analyzing content in the page opened in response to each search behavior of the plurality of users, to determine whether the search behavior has a financial need.

Specifically, when it is found through the analysis that the content in the opened page contains certain phrases or sentences whose meanings are related to a financial need, it may be determined that the search behavior has the financial need; or a second financial need value D2 may be determined according to the number and/or the levels of such phrases or sentences whose meanings are related to the financial need.

3) Determining whether the search behavior has a financial need through the attribute of the website opened in response to each search behavior of the plurality of users.

Specifically, when it is determined that the website has a financial attribute, it may be deduced that the search behavior has the financial need; or a third financial need value D3 may be determined according to the financial attribute level of the website.

Specifically, the network device may determine whether a search behavior has a financial need based on the following formula:

$$D(n)=a*D1(n)+b*D2(n)+c*D3(n) \qquad (1)$$

wherein n represents the $n^{th}$ search behavior of a user, a, b, and c are weight values of the foregoing three modes, and $D(n)$ is the financial need value of the $n^{th}$ search behavior of the user.

Based on the above formula (1), the network device may determine that the $n^{th}$ search behavior:

has a financial need when $D(n-1) \geq$ a preset threshold T; and does not have a financial need when $D(n-1)<$ the preset threshold T.

Preferably, the network device may also determine, based on each search behavior of the plurality of users in combination with a search behavior prior to the each search behavior, whether the each search behavior has a financial need. In short, if a given proportion of the prior search behavior of a user is determined as having a financial need or the financial need value determined according to the formula (1) exceeds a preset threshold, there is a high probability that a subsequent search behavior of the user has a financial need. Specifically, the network device may determine, according to the prior search behavior of the user, whether the current search behavior has a financial need based on the following formula:

$$D(n)'=(1+f(D(n-1))*a)*D(n) \qquad (2)$$

wherein, $D(n-1)$ is the financial need value of the last search behavior of the user;

$D(n)$ is the financial need value obtained based on the current search behavior of the user;

$f(D(n-1))=1$, when $D(n-1) \geq$ the preset threshold T; and
$f(D(n-1))=0$, when $D(n-1)<$ the preset threshold T.

The foregoing formulas are to be considered as exemplary, and not restrictive. It will be appreciated by those skilled in the art that other formulas based on the concept of the present invention may also be used to determine whether a search behavior of a user has a financial need, and such formulas shall also fall within the protection scope of the present invention, and are incorporated herein by reference. In addition, those skilled in the art can determine, through statistics and analysis, a proper preset threshold T as required based on the above concept of the present invention.

Then, at step S1022 (not shown), the network device determines, by analyzing the information regarding the search behavior of the plurality of users having a financial need that are determined in step S1021, the financial instrument corresponding to each search behavior of the plurality of users having a financial need.

Example 2

At step S1021' (not shown), the network device 2 determines, by analyzing the user search behavior information of the plurality of users, the financial instrument corresponding to each search behavior of the plurality of users.

Then, at step S1022' (not shown), the network device 2 determines, by performing an initial need analysis of the search behavior information of the plurality of users, the search behavior of the plurality of users having a financial need, so as to determine the financial instrument corresponding to each search behavior of the plurality of users having a financial need.

Similarly, the step of determining, by performing initial need analysis of the search behavior information of the plurality of users, the search behavior of the plurality of users having a financial need includes at least one of the following modes:

1) Performing semantic analysis of the query sequence in each search behavior of the plurality of users, to determine whether the search behavior has a financial need.

Specifically, when it is found that the query sequence contains certain keywords whose meanings are related to a financial need, it can be determined that the search behavior has the financial need; or a first financial need value D1 may be determined according to the number and/or the levels of such keywords whose meanings are related to the financial need.

2) Analyzing content in the page opened in response to each search behavior of the plurality of users, to determine whether the search behavior has a financial need.

Specifically, when it is found through the analysis that the content in the opened page contains certain phrases or sentences whose meanings are related to a financial need, it may be determined that the search behavior has the financial need; or a second financial need value D2 may be determined according to the number and/or the levels of such phrases or sentences whose meanings are related to the financial need.

3) Determining whether the search behavior has a financial need through the attribute of the website opened in response to each search behavior of the plurality of users.

Specifically, when it is determined that the website has a financial attribute, it may be deduced that the search behavior has the financial need; or a third financial need value D3 may be determined according to the financial attribute level of the website.

Specifically, the network device may determine whether a search behavior has a financial need based on the following formula:

$$D(n)=a*D1(n)+b*D2(n)+c*D3(n) \qquad (1)$$

wherein n represents the $n^{th}$ search behavior of a user, a, b, and c are weight values of the foregoing three modes, and $D(n)$ is the financial need value of the $n^{th}$ search behavior of the user.

Based on the above formula (1), the network device may determine that the $n^{th}$ search behavior:

has a financial need when $D(n-1) \geq$ a preset threshold T; and does not have a financial need when $D(n-1)<$ the preset threshold T.

Preferably, the network device may also determine, based on each search behavior of the plurality of users in combination with a search behavior prior to the each search behavior, whether the each search behavior has a financial need. In short, if a given proportion of the prior search behavior of a user is determined as having a financial need or the financial need value determined according to the formula (1) exceeds a preset threshold, there is a high probability that a subsequent search behavior of the user has a financial need. Specifically, the network device may determine, according to the prior search behavior of the user, whether the current search behavior has a financial need based on the following formula:

$$D(n)'=(1+f(D(n-1))*a)*D(n) \quad (2)$$

wherein,

D(n−1) is the financial need value of the last search behavior of the user;

D(n) is the financial need value obtained based on the current search behavior of the user;

f(D(n−1))=1, when D(n−1)≥the preset threshold T; and f(D(n−1))=0, when D(n−1)<the preset threshold T.

The foregoing formulas are to be considered as exemplary, and not restrictive. It will be appreciated by those skilled in the art that other formulas based on the concept of the present invention may also be used to determine whether a search behavior of a user has a financial need, and such formulas shall also fall within the protection scope of the present invention, and are incorporated herein by reference. In addition, those skilled in the art can determine, through statistics and analysis, a proper preset threshold T as required based on the above concept of the present invention.

Then, in step S103, the network device 2 determines, based on the determined financial instrument corresponding to each search behavior of the plurality of users having a financial need, the user attention information corresponding to each of the determined financial instruments.

Specifically, the network device may collect statistics based on the determination results for each search behavior of the users having a financial need at step S102, so as to obtain the user attention information corresponding to the financial instruments that are determined at step S102.

Optionally, at step S104, the network device may publish over a network, on various information publishing platforms such as websites, BBS, WeChat groups, and microblogs, the user attention information corresponding to each of the financial instruments that is determined at step S103, or provide the user attention information to a financial institution for further data analysis or for generating other financial information.

Figure 2:
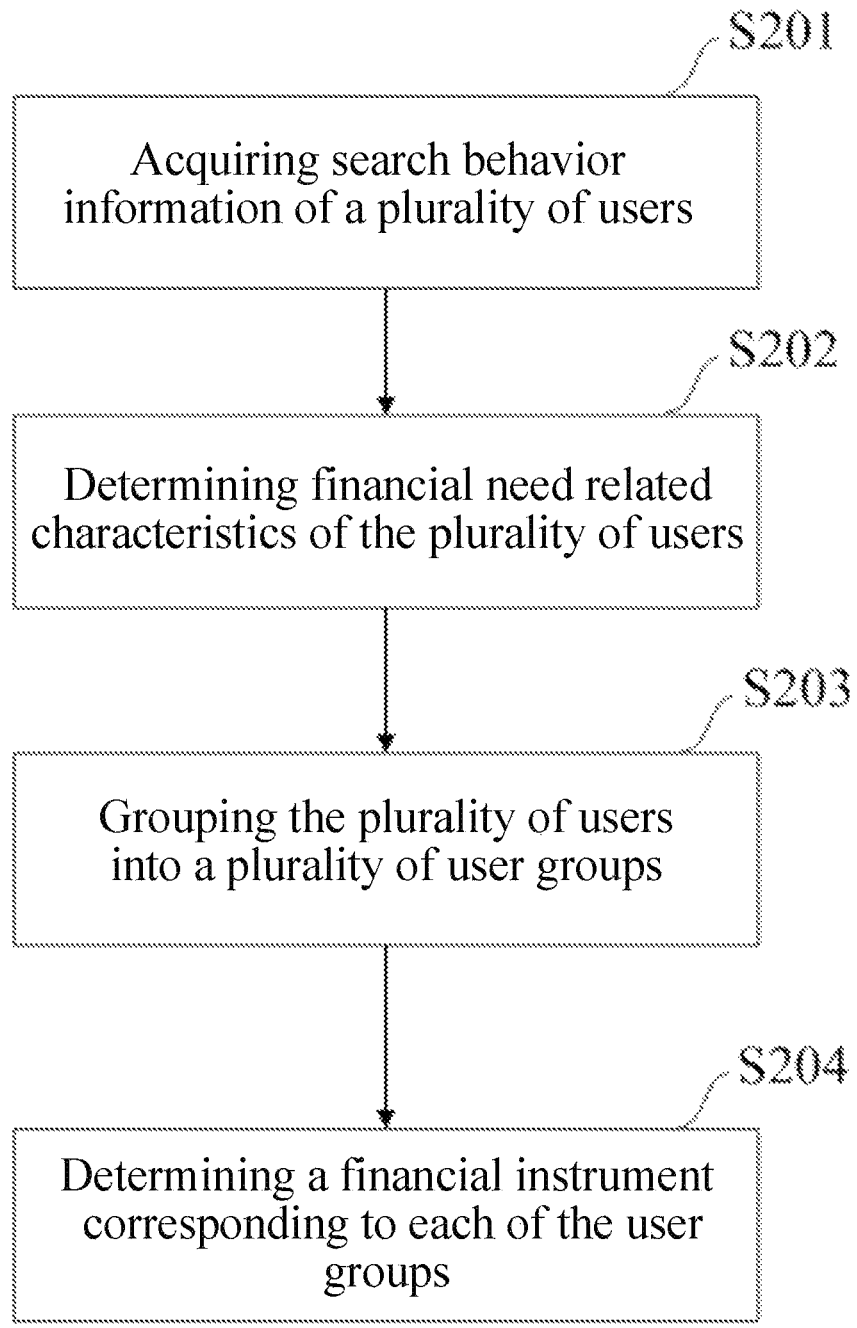
FIG. 2 is a flowchart of a method for providing financial instrument information to users based on search behavior of the users according to an embodiment of the present invention.

FIG. 2 is a flowchart of a method for providing financial instrument information to users based on the search behavior of the users according to an embodiment of the present invention.

This embodiment is described below with reference to FIG. 2.

In step S201, a network device acquires search behavior information of a plurality of users.

The search behavior information of the plurality of users includes at least one of the following: a query sequence of each user, operation information such as click and access by each user on a search result obtained in response to the query sequence, and the page that each user accesses after clicking the search result.

The search behavior information may be acquired in advance by the network device or other network devices that interact with each user equipment, and stored in a storage device. The network device accesses the storage device to read the search behavior information of the plurality of users. The storage device may be integrated with the network device or independent of the network device 2.

At step S202, the network device determines financial need related characteristics of each user based on the search behavior information of the user. The financial need related characteristics of the user include at least one of the following: a specific financial field F of interest to the user, a financial need strength S of the user, and a financial need level P of the user. Specifically:

For the specific financial field of interest to each user, the network device may determine the specific financial field of interest to each user by analyzing the search behavior information such as the query sequence of each user, and/or the operation such as click and access by each user on one or more of search results provided in response to the query sequence, and/or the page that each user accesses after clicking the search result. For example, when it is found that the query sequence and/or the search result that the user clicks and/or content in the page contain some keywords whose meanings are related to specific financial fields, the specific financial fields F(1), F(2), F(3) and so on that are of interest to the user can be determined.

For the financial need strength of each user, the network device may determine the financial need strength of each user by analyzing the search behavior information such as the query sequence of each user, and/or the operation such as click and access by each user on one or more of search results provided in response to the query sequence, and/or the page that each user accesses after clicking the search result. For example, the financial need strength S of the user may be determined according to the number and/or the levels of the keywords that are related to the financial need strength and are contained in: the query sequence and/or the search result that the user clicks and/or content in the page.

For the financial need level of each user, the network device may determine the financial need level of each user by analyzing the search behavior information such as the query sequence of each user, and/or the operation such as click and access by each user on one or more of search results provided in response to the query sequence, and/or the page that each user accesses after clicking the search result. For example, the financial need level P of the user may be determined based on the number and/or the levels of keywords that are contained in the query sequence and/or the search result that the user clicks and/or content in the page and that are related to the financial need level.

Preferably, step S202 includes sub-steps S2021 (not shown) and S2022 (not shown).

At sub-step S2021, the network device selects users having a financial need by performing initial need analysis of the search behavior information of the plurality of users. The mode of performing initial need analysis of the search behavior of the users is the same as the mode of determining whether the search behavior of the users having a financial need in the embodiment described above with reference to FIG. 1, which is incorporated herein by reference for brevity, and not repeated here.

Then, at sub-step S2022, the network device determines the financial need related characteristics of the users having a financial need based on the search behavior of the users having the financial need. The mode of determining the financial need related characteristics of the users having the financial need is the same as the mode of determining the financial need related characteristics of the users in the foregoing step S202, which is incorporated herein by reference for brevity, and not repeated here.

Preferably, the network device may determine the financial need related characteristics of the users based on the search behavior of the users in combination with the natural attribute of the users.

The natural attribute of the user includes at least one of the following: the age of the user, the gender of the user, the occupation of the user, the consumption level of the user, and the geographical location of the user.

At step S203, the network device groups the plurality of users into a plurality of user groups according to the determined financial need related characteristics of the users, wherein each of the user groups has a corresponding financial need related characteristic.

At step S204, the network device determines the financial instrument corresponding to each of the user groups by matching the financial need related characteristic of each of the user groups with instrument characteristics of a plurality of financial instruments. It will be appreciated by those skilled in the art that step S203 and step S204 are independent of each other in terms of time, that is, step S204 does not need to immediately follow step S203 in time.

Optionally, at step S205 (not shown), the network device may publish over a network, on various information publishing platforms such as websites, BBS, WeChat groups, and microblogs, the financial instrument information corresponding to each of the user groups that is determined in step S204, or provide the financial instrument information to a financial institution for further data analysis or for generating other financial information.

Figure 3:
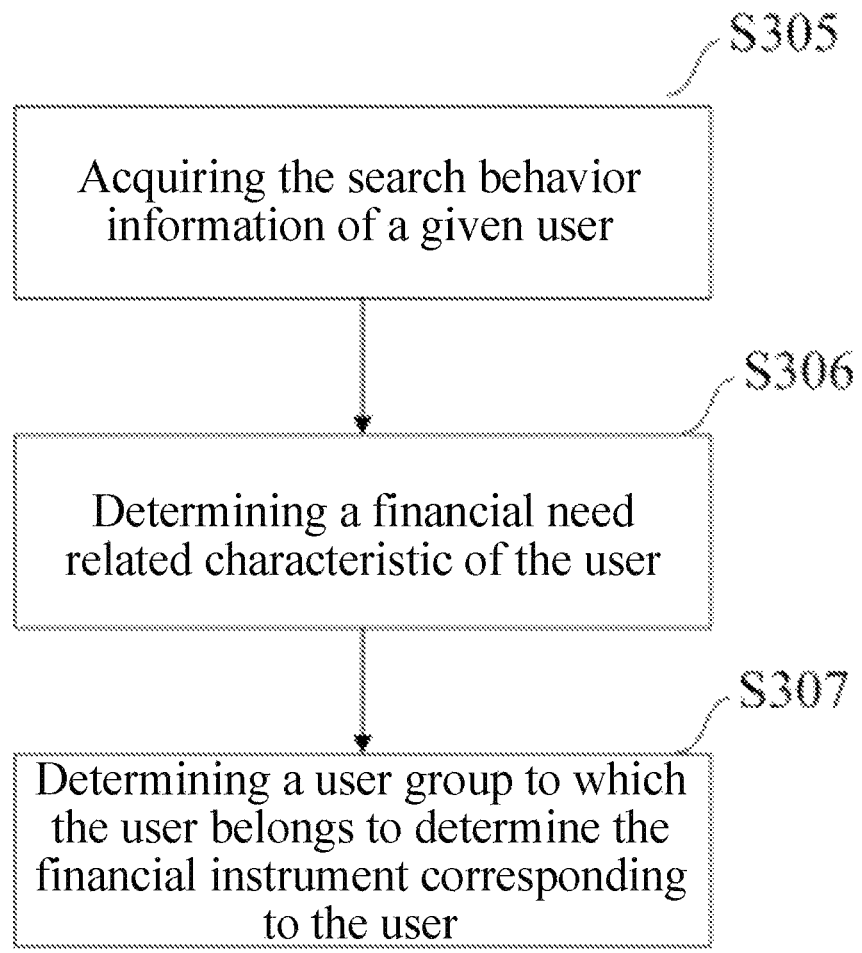
FIG. 3 is a flowchart of a method for providing financial instrument information to users based on search behavior of the user according to another embodiment of the present invention.

FIG. 3 is a flowchart of a method for providing financial instrument information to users based on search behavior of the users according to another embodiment of the present invention.

This embodiment is described below with reference to FIG. 3.

Steps S301 to S304 (not shown) in FIG. 3 are the same as the steps S201 to S204 shown in FIG. 2, which are incorporated herein by reference for brevity, and not repeated here.

In step S305, the network device acquires search behavior information of one user.

The search behavior information of the plurality of users includes at least one of the following: a query sequence of each user, operation information such as click and access by each user on a search result obtained in response to the query sequence, and the page that each user accesses after clicking the search result.

The search behavior information may be acquired in advance by the network device or other network devices that interact with each user equipment, and stored in a storage device. The network device accesses the storage device to read the search behavior information of the plurality of users. The storage device may be integrated with the network device or independent of the network device.

At step S306, the network device determines financial need related characteristics of each user based on the search behavior information of the user. The financial need related characteristic of the user includes at least one of the following: a specific financial field F of interest to the user, a financial need strength S of the user, and a financial need level P of the user. Specifically:

For the specific financial field of interest to each user, the network device may determine the specific financial field of interest to each user by analyzing the search behavior information such as the query sequence of each user, and/or the operation such as clicking and accessing of each user on one or more of search results provided in response to the query sequence, and/or the page that each user accesses after clicking the search result. For example, when it is found that the query sequence and/or the search result that the user clicks and/or content in the page contain some keywords whose meanings are related to specific financial fields, the specific financial fields F(1), F(2), F(3) and so on that are of interest to the user can be determined.

For the financial need strength of each user, the network device may determine the financial need strength of each user by analyzing the search behavior information such as the query sequence of each user, and/or the operation such as clicking and accessing of each user on one or more of search results provided in response to the query sequence, and/or the page that each user accesses after clicking the search result. For example, the financial need strength S of the user may be determined according to the number and/or the levels of the keywords that are related to the financial need strength and are contained in: the query sequence and/or the search result that the user clicks and/or content in the page.

For the financial need level of each user, the network device may determine the financial need level of each user by analyzing the search behavior information such as the query sequence of each user, and/or the operation such as clicking and accessing of each user on one or more of search results provided in response to the query sequence, and/or the page that each user accesses after clicking the search result. For example, the financial need level P of the user may be determined based on the number and/or levels of keywords that are contained in a query sequence and/or a search result that the user clicks and/or content of a page and that are related to the financial need level.

Then, at step S307, the network device determines the user group to which the user belongs based on the financial need related characteristic of the user, and the determined financial need related characteristics of the plurality of user groups, so as to determine the financial instrument corresponding to the user.

Specifically, the items in the financial need related characteristic of the user that is determined in the step S306 are compared with the items in the financial need related characteristics of the user groups, and if it is found that the differences between the items of the financial need related characteristic of the user and the items of the financial need related characteristics of the user group are all within a preset range, it can be ascertained that the user belongs to the user group, and therefore the financial instrument corresponding to the user group can be used as the financial instrument corresponding to the user.

It will be appreciated by those skilled in the art that in addition to the foregoing modes, the user group to which the user belongs may also be determined in other modes based on the concept of the present invention, and such modes shall also fall within the protection scope of the present invention, and are incorporated herein by reference.

It will be appreciated by those skilled in the art that the foregoing steps S305-S307 are independent of steps S301-S304 in terms of the time, that is, the steps S305-S307 do not need to immediately follow the operations in the steps S301-S304 in time.

Figure 4:
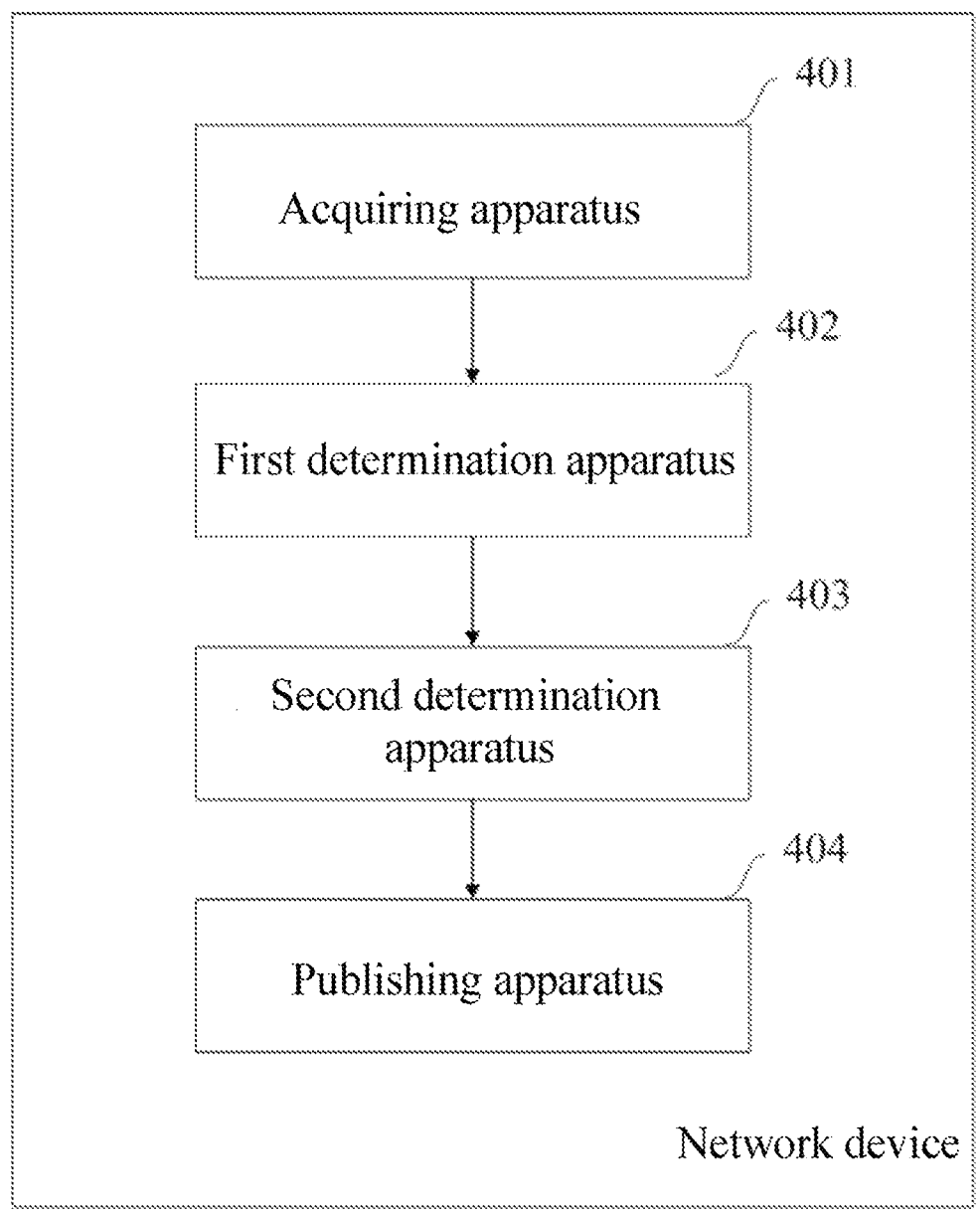
FIG. 4 is a schematic diagram of an apparatus for performing data mining based on search behavior of the user to determine information regarding user attention to financial instruments according to an embodiment of the present invention.

FIG. 4 is a schematic diagram of an apparatus for performing data mining based on search behavior of a user to determine user attention information of financial instruments according to an embodiment of the present invention.

This embodiment is described below with reference to FIG. 4.

As shown in FIG. 4, an apparatus 401 of a network device, hereinafter briefly referred to as an "acquiring apparatus", acquires search behavior information of a plurality of users.

The search behavior information of the plurality of users includes at least one of the following: a query sequence of each user, operation information such as click and access by each user on a search result obtained in response to the query sequence, and the page that each user accesses after clicking the search result.

The search behavior information may be acquired in advance by the network device or other network devices that interact with each user equipment, and stored in a storage device. The acquiring apparatus 401 accesses the storage device to read the search behavior information of the plurality of users. The storage device may be integrated with the network device or independent of the network device.

Then, an apparatus 402 of the network device, hereinafter briefly referred to as a "first determination apparatus", determines, based on the search behavior information of the plurality of users, financial instruments corresponding to the search behavior of the plurality of users.

Specifically, for each search behavior of each of the plurality of users, the first determination apparatus 402 may determine the financial instrument corresponding to the search behavior by analyzing the query sequence of each user, the operation such as click and access by each user on one or more search results provided in response to the query sequence, and/or the page that each user accesses after clicking the search result.

Then, an apparatus 403 of the network device, hereinafter briefly referred to as a "second determination apparatus", determines, based on the determined financial instrument corresponding to each search behavior of the plurality of users, user attention information corresponding to each of the determined financial instruments. The user attention information includes, but not limited to, at least one of the following: the total number of times the user pays attention, the number of times the user pays attention within a period of time or the user attention frequency, and a time dependent user attention frequency curve.

Specifically, the second determination apparatus 403 may collect statistics based on the determination results for each user search behavior from the first determination apparatus 402, so as to obtain the user attention information corresponding to the financial instruments that are determined by the first determination apparatus 402.

Optionally, an apparatus 404 of the network device, hereinafter briefly referred to as a "publishing apparatus", may publish over a network, on various information publishing platforms such as websites, BBS, WeChat groups, and microblogs, the user attention information corresponding to each of the financial instruments that is determined by the second determination apparatus 403, or provide the user attention information to a financial institution for further data analysis or for generating other financial information.

In a preferred embodiment, the first determination apparatus 402 of the network device determines, based on the search behavior information of the plurality of users, the financial instrument corresponding to each search behavior of the plurality of users having a financial need. A description is provided below through two examples.

Example 1

The first determination apparatus 402 includes a first determination module 4021 (not shown) and a second determination module 4022 (not shown).

The first determination module 4021 determines, by performing an initial need analysis of the search behavior information of the plurality of users, the search behavior having a financial need of the plurality of users.

The first determination module 4021 determines, by performing the initial need analysis of the search behavior information of the plurality of users, the search behavior having a financial need of the plurality of users by at least one of the following modes:

1) Performing semantic analysis of the query sequence in each search behavior of the plurality of users, to determine whether the search behavior has a financial need.

Specifically, when it is found that the query sequence contains certain keywords whose meanings are related to a financial need, it can be determined that the search behavior has the financial need; or a first financial need value D1 may be determined according to the number and/or the levels of such keywords whose meanings are related to the financial need.

2) Analyzing content in the page opened in response to each search behavior of the plurality of users, to determine whether the search behavior has a financial need.

Specifically, when it is found through the analysis that the content in the opened page contains certain phrases or sentences whose meanings are related to a financial need, it may be determined that the search behavior has the financial need; or a second financial need value D2 may be determined according to the number and/or the levels of such phrases or sentences whose meanings are related to the financial need.

3) Determining whether the search behavior has a financial need through the attribute of the website opened in response to each search behavior of the plurality of users.

Specifically, when it is determined that the website has a financial attribute, it may be deduced that the search behavior has the financial need; or a third financial need value D3 may be determined according to the financial attribute level of the website.

Specifically, the network device may determine whether a search behavior has a financial need based on the following formula:

$$D(n)=a*D1(n)+b*D2(n)+c*D3(n) \quad (1)$$

wherein n represents the nth search behavior of a user, a, b, and c are weight values of the foregoing three modes, and D(n) is the financial need value of the nth search behavior of the user.

Based on the above formula (1), the network device may determine that the nth search behavior:

has a financial need when $D(n-1) \geq$ a preset threshold T; and does not have a financial need when $D(n-1) <$ the preset threshold T.

Preferably, the network device may also determine, based on each search behavior of the plurality of users in combination with a search behavior prior to the each search behavior, whether the each search behavior has a financial need. In short, if a given proportion of the prior search behavior of a user is determined as having a financial need or the financial need value determined according to the formula (1) exceeds a preset threshold, there is a high probability that a subsequent search behavior of the user has a financial need. Specifically, the network device may determine, according to the prior search behavior of the user, whether the current search behavior has a financial need based on the following formula:

$$D(n)'=(1+f(D(n-1))*a)*D(n) \quad (2)$$

wherein,

D(n−1) is the financial need value of the last search behavior of the user;

D(n) is the financial need value obtained based on the current search behavior of the user;

f(D(n−1)=1, when D(n−1)≥the preset threshold T; and f(D(n−1)=0, when D(n−1)<the preset threshold T.

The foregoing formulas are to be considered as exemplary, and not restrictive. It will be appreciated by those skilled in the art that other formulas based on the concept of the present invention may also be used to determine whether a search behavior of a user has a financial need, and such formulas shall also fall within the protection scope of the present invention, and shall be incorporated herein by reference. In addition, those skilled in the art can determine, through statistics and analysis, a proper preset threshold T as required based on the above concept of the present invention.

Then, the second determination module 4022 determines, by analyzing the information regarding the search behavior having a financial need of the plurality of users that are determined in step S1021, the financial instrument corresponding to each search behavior having a financial need of the plurality of users.

Example 2

The first determination apparatus 402 includes a third determination module 4021' (not shown) and a fourth determination module 4022' (not shown);

The third determination module 4021' determines, by analyzing the user search behavior information of the plurality of users, the financial instrument corresponding to each search behavior of the plurality of users.

Then, the fourth determination module 4022' determines, by performing an initial need analysis of the search behavior information of the plurality of users, the search behavior of the plurality of users having a financial need, so as to determine the financial instrument corresponding to each search behavior of the plurality of users having a financial need.

Similarly, the fourth determination module 4022' may determine, by performing the initial need analysis of the search behavior information of the plurality of users, the search behavior of the plurality of users having a financial need by at least one of the following modes:

1) Performing semantic analysis of the query sequence in each search behavior of the plurality of users, to determine whether the search behavior has a financial need.

Specifically, when it is found that the query sequence contains certain keywords whose meanings are related to a financial need, it can be determined that the search behavior has the financial need; or a first financial need value D1 may be determined according to the number and/or the levels of such keywords whose meanings are related to the financial need.

2) Analyzing content in the page opened in response to each search behavior of the plurality of users, to determine whether the search behavior has a financial need.

Specifically, when it is found through the analysis that the content in the opened page contains certain phrases or sentences whose meanings are related to a financial need, it may be determined that the search behavior has the financial need; or a second financial need value D2 may be determined according to the number and/or the levels of such phrases or sentences whose meanings are related to the financial need.

3) Determining whether the search behavior has a financial need through the attribute of the website opened in response to each search behavior of the plurality of users.

Specifically, when it is determined that the website has a financial attribute, it may be deduced that the search behavior has the financial need; or a third financial need value D3 may be determined according to the financial attribute level of the website.

Specifically, the network device may determine whether a search behavior has a financial need based on the following formula:

$$D(n)=a*D1(n)+b*D2(n)+c*D3(n) \quad (1)$$

wherein n represents the nth search behavior of a user, a, b, and c are weight values of the foregoing three modes, and D(n) is the financial need value of the nth search behavior of the user.

Based on the above formula (1), the network device may determine that the nth search behavior:

has a financial need when D(n−1)≥a preset threshold T; and does not have a financial need when D(n−1)<the preset threshold T.

Preferably, the fourth determination module 4022' may also determine, based on each search behavior of the plurality of users in combination with a search behavior prior to the each search behavior, whether the each search behavior has a financial need. In short, if a given proportion of the prior search behavior of a user is determined as having a financial need or the financial need value determined according to the formula (1) exceeds a preset threshold, there is a high probability that a subsequent search behavior of the user has a financial need. Specifically, the fourth determination module 4022' may determine, according to the prior search behavior of the user, whether the current search behavior has a financial need based on the following formula:

$$D(n)'=(1+f(D(n-1))*a)*D(n) \quad (2)$$

wherein,

D(n−1) is the financial need value of the last search behavior of the user;

D(n) is the financial need value obtained based on the current search behavior of the user;

f(D(n−1)=1, when D(n−1)≥the preset threshold T; and f(D(n−1)=0, when D(n−1)<the preset threshold T.

The foregoing formulas are to be considered as exemplary, and not restrictive. It will be appreciated by those skilled in the art that other formulas based on the concept of the present invention may also be used to determine whether a search behavior of a user has a financial need, and such formulas shall also fall within the protection scope of the present invention, and are incorporated herein by reference. In addition, those skilled in the art can determine, through statistics and analysis, a proper preset threshold T as required based on the above concept of the present invention.

Then, the second determination apparatus 403 determines, based on the determined financial instrument corresponding to each search behavior of the plurality of users having a financial need, the user attention information corresponding to each of the determined financial instruments.

Specifically, the second determination apparatus 403 may collect statistics based on the determination results for each search behavior of the users having a financial need at step S102, so as to obtain the user attention information corresponding to the financial instruments that are determined by the first determination apparatus 402.

Optionally, the publishing apparatus 404 of the network device may publish over a network, on various information publishing platforms such as websites, BBS, WeChat groups, and microblogs, the user attention information corresponding to each of the financial instruments that is determined by the second determination apparatus 403, or provide the user attention information to a financial institution for further data analysis or for generating other financial information.

It will be appreciated by those skilled in the art that the apparatuses or modules in the network device according to the embodiment described above with reference to FIG. 4 may be separate modules, or all or some of the apparatuses or modules may be integrated in a single apparatus.

Figure 5:
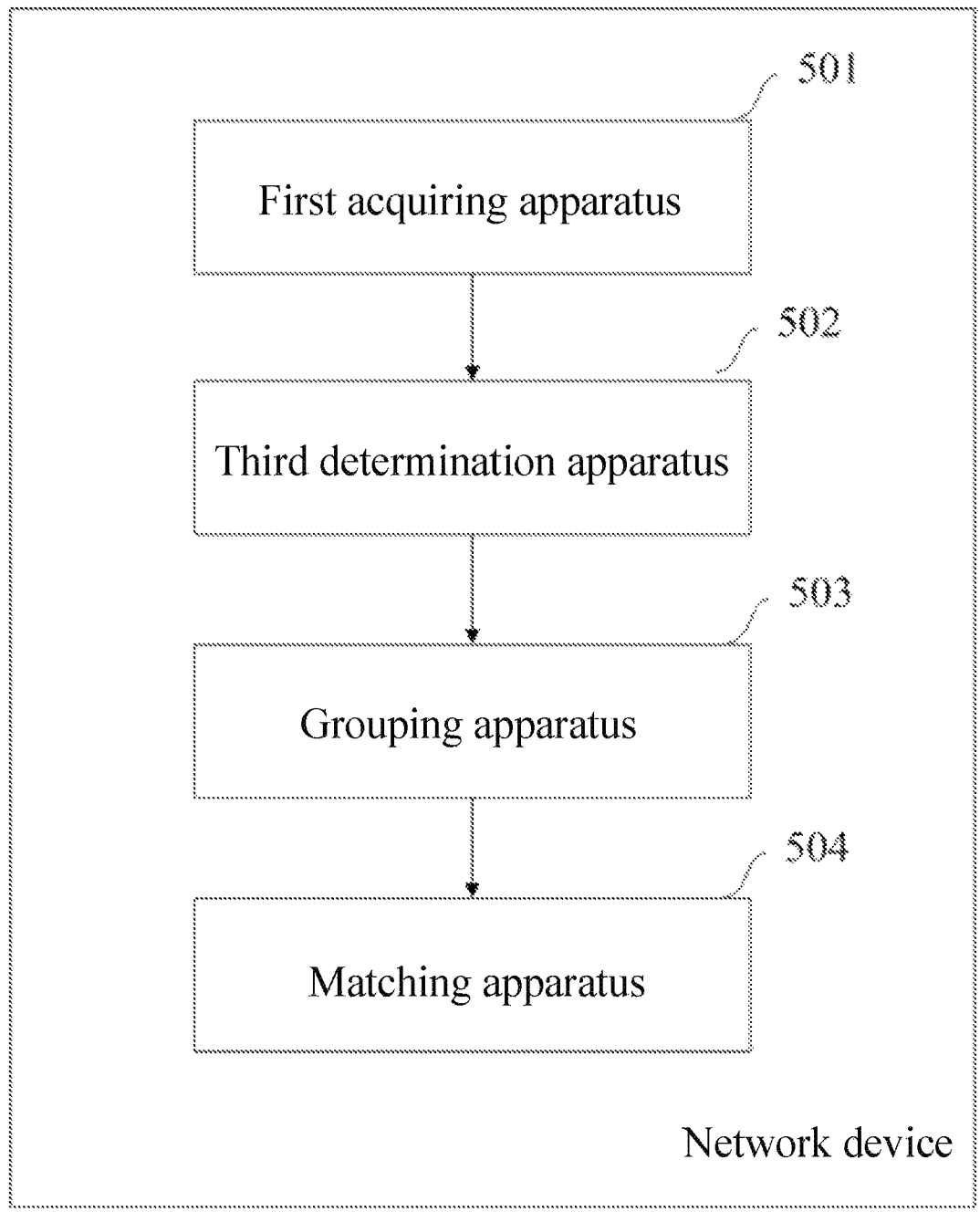
FIG. 5 is a schematic diagram of an apparatus for providing financial instrument information to users based on search behavior of the user according to an embodiment of the present invention.

FIG. 5 is a schematic diagram of an apparatus for providing financial instrument information to users based on search behavior of the users according to an embodiment of the present invention.

This embodiment is described below with reference to FIG. 5.

An apparatus 501 in a network device, hereinafter briefly referred to as a "first acquiring apparatus", acquires search behavior information of a plurality of users.

The search behavior information of the plurality of users includes at least one of the following: a query sequence of each user, operation information such as click and access by each user on a search result obtained in response to the query sequence, and the page that each user accesses after clicking the search result.

The search behavior information may be acquired in advance by the network device or other network devices that interact with each user equipment, and stored in a storage device. The acquiring apparatus 501 accesses the storage device to read the search behavior information of the plurality of users. The storage device may be integrated with the network device or independent of the network device.

An apparatus 502 of the network device, hereinafter briefly referred to as a "third determination apparatus", determines financial need related characteristics of each user based on the search behavior information of the user. The financial need related characteristics of the user include at least one of the following: a specific financial field F of interest to the user, a financial need strength S of the user, and a financial need level P of the user. Specifically:

For the specific financial field of interest to each user, the third determination apparatus 502 may determine the specific financial field of interest to each user by analyzing the search behavior information such as the query sequence of each user, and/or the operation such as click and access by each user on one or more of search results provided in response to the query sequence, and/or the page that each user accesses after clicking the search result. For example, when it is found that the query sequence and/or the search result that the user clicks and/or content in the page contain some keywords whose meanings are related to specific financial fields, the specific financial fields F(1), F(2), F(3) and so on that are of interest to the user can be determined.

For the financial need strength of each user, the third determination apparatus 502 may determine the financial need strength of each user by analyzing the search behavior information such as the query sequence of each user, and/or the operation such as click and access by each user on one or more of search results provided in response to the query sequence, and/or the page that each user accesses after clicking the search result. For example, the financial need strength S of the user may be determined according to the number and/or the levels of the keywords that are related to the financial need strength and are contained in: the query sequence and/or the search result that the user clicks and/or content in the page.

For the financial need level of each user, the third determination apparatus 502 may determine the financial need level of each user by analyzing the search behavior information such as the query sequence of each user, and/or the operation such as click and access by each user on one or more of search results provided in response to the query sequence, and/or the page that each user accesses after clicking the search result. For example, the financial need level P of the user may be determined based on the number and/or the levels of keywords that are contained in the query sequence and/or the search result that the user clicks and/or content in the page and that are related to the financial need level.

Preferably, the third determination module 502 includes a selecting module 5021 (not shown) and a determination module 5022 (not shown).

The selecting module 5021 selects a plurality of users having a financial need by performing an initial need analysis of the search behavior information of the plurality of users. The mode of performing the initial need analysis is the same as the mode of determining whether the search behavior of users having a financial need in the embodiment described above with reference to FIG. 4, which is incorporated herein by reference for brevity, and not repeated here.

Then, the determination module 5022 determines the financial need related characteristics of the users based on the search behavior of the user having a financial need. The mode of determining the financial need related characteristics of the users having a financial need is the same as the mode of determining the financial need related characteristics of the users in the foregoing step S202, which is incorporated herein by reference. For the purpose of brevity, the details are not described herein again.

Preferably, the third determination module 502 may determine the financial need related characteristics of the users based on the search behavior of the user in combination with the natural attribute of the users.

The natural attribute of the user includes at least one of the following: the age of the user, the gender of the user, the occupation of the user, the consumption level of the user, and the geographical location of the user.

An apparatus 503 of the network device, hereinafter briefly referred to as a "grouping apparatus", groups the plurality of users into a plurality of user groups according to the determined financial need related characteristics of the users, wherein each of the user groups has a corresponding financial need related characteristic.

An apparatus 504 of the network device, hereinafter briefly referred to as a "matching apparatus", determines the financial instrument corresponding to each of the user groups by matching the financial need related characteristic of each of the user groups with instrument characteristics of a plurality of financial instruments. It will be appreciated by those skilled in the art that the operation of the matching apparatus 504 and the operation of the grouping apparatus 503 are independent of each other in terms of time, that is, the operation of the matching apparatus 504 does not need to immediately follow the operation of the grouping apparatus 503 in time.

Optionally, a publishing apparatus 510 (not shown) of the network device may publish over a network, on various information publishing platforms such as websites, BBS, WeChat groups, and microblogs, the financial instrument information corresponding to each of the user groups that is determined by the matching apparatus 504, or provide the financial instrument information to a financial institution for further data analysis or for generating other financial information.

It will be appreciated by those skilled in the art that the apparatuses or modules in the network device according to the embodiment described above with reference to FIG. 5 may be separate modules, or all or some of the apparatuses or modules may be integrated in a single apparatus.

Figure 6:
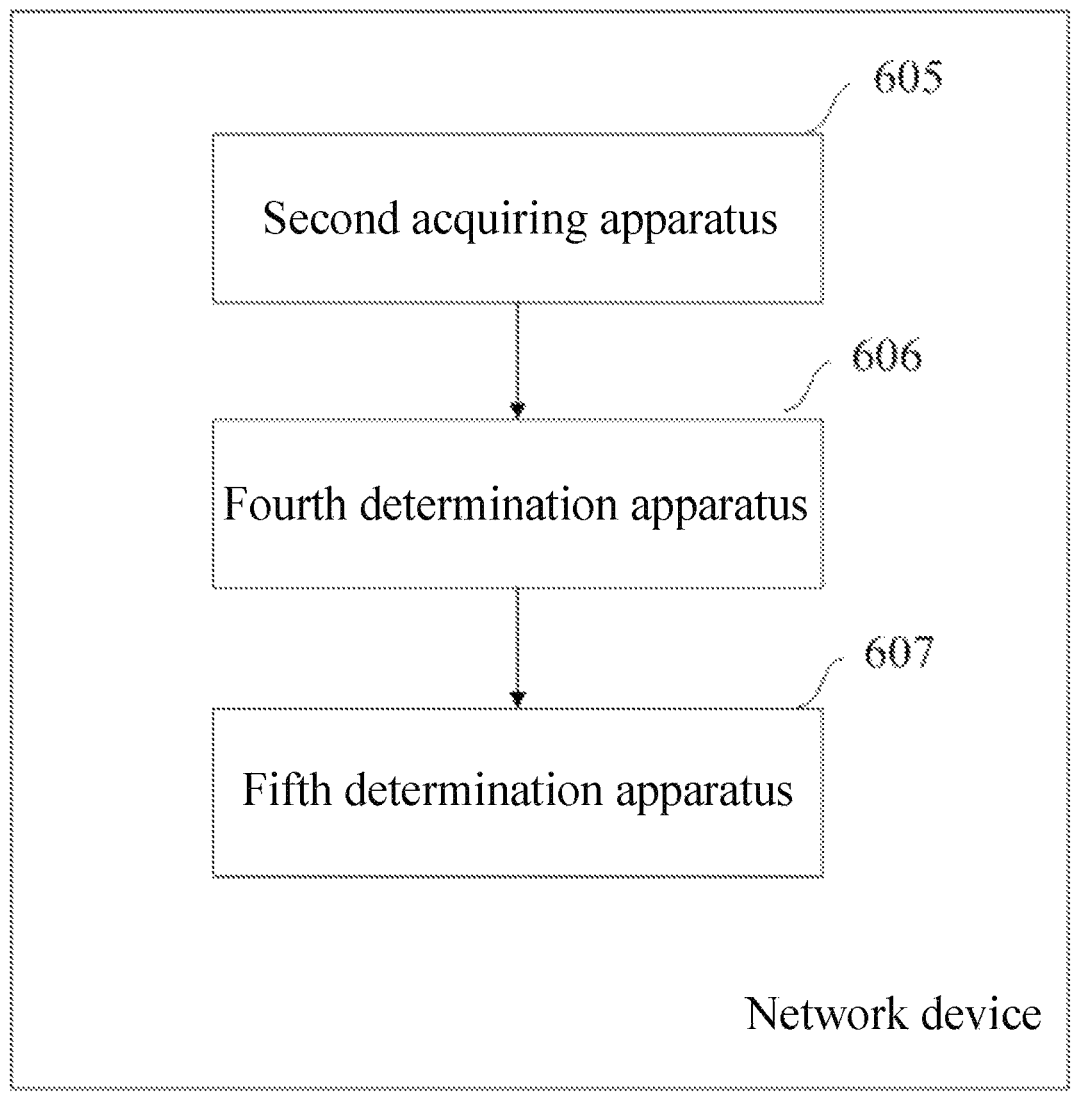
FIG. 6 is a schematic diagram of an apparatus for providing financial instrument information to users based on search behavior of the user according to another embodiment of the present invention.

FIG. 6 is a schematic diagram of an apparatus for providing financial instrument information to users based on the search behavior of the user according to another embodiment of the present invention.

This embodiment is described below with reference to FIG. 6.

Operations performed by apparatuses 601 to 604 and 610 (not shown) in FIG. 6 are the same as those performed by the apparatuses 501 to 504 and 510 in FIG. 5, which are incorporated herein by reference for brevity, and not repeated here.

A second acquiring apparatus 605 of the network device acquires search behavior information of one user. It will be appreciated by those skilled in the art that the first acquiring apparatus 601 and the second acquiring apparatus 605 may be the same apparatus or different apparatuses.

The search behavior information of the user includes at least one of the following: a query sequence of the user, operation information such as click and access by the user on a search result obtained in response to the query sequence, and a page that the user accesses after clicking the search result.

The search behavior information of the user is acquired in real time by a network device by interacting with a user equipment of the user; or is acquired in advance by the network device or other network devices that interact with the user equipment of the user, and stored in a storage device. The second acquiring apparatus 605 of the network device accesses the storage device to read the search behavior information of the user. The storage device may be integrated with the network device or independent of the network device.

An apparatus 606 of the network device, hereinafter briefly referred to as a "fourth determination apparatus", determines financial need related characteristics of each user based on the search behavior information of the user. It will be appreciated by those skilled in the art that the third determination apparatus 601 and the second acquiring apparatus 605 may be the same apparatus or different apparatuses. The financial need related characteristic of the user includes at least one of the following: a specific financial field F of interest to the user, a financial need strength S of the user, and a financial need level P of the user. Specifically:

For the specific financial field of interest to each user, the fourth determination apparatus 606 may determine the specific financial field of interest to each user by analyzing the search behavior information such as the query sequence of each user, and/or the operation such as click and access by each user on one or more of search results provided in response to the query sequence, and/or the page that each user accesses after clicking the search result. For example, when it is found that the query sequence and/or the search result that the user clicks and/or content in the page contain some keywords whose meanings are related to specific financial fields, the specific financial fields F(1), F(2), F(3) and so on that are of interest to the user can be determined.

For the financial need strength of each user, the fourth determination apparatus 606 may determine the financial need strength of each user by analyzing the search behavior information such as the query sequence of each user, and/or the operation such as click and access by each user on one or more of search results provided in response to the query sequence, and/or the page that each user accesses after clicking the search result. For example, the financial need strength S of the user may be determined according to the number and/or the levels of the keywords that are related to the financial need strength and are contained in: the query sequence and/or the search result that the user clicks and/or content in the page.

For the financial need level of each user, the fourth determination apparatus 606 may determine the financial need level of each user by analyzing the search behavior information such as the query sequence of each user, and/or the operation such as click and access by each user on one or more of search results provided in response to the query sequence, and/or the page that each user accesses after clicking the search result. For example, the financial need level P of the user may be determined based on the number and/or the levels of keywords that are contained in the query sequence and/or the search result that the user clicks and/or content in the page and that are related to the financial need level.

Then, an apparatus 607 of the network device, hereinafter briefly referred to as a "fifth determination apparatus", determines a user group to which the user belongs based on the financial need related characteristic of the user and the determined financial need related characteristics of the plurality of user groups, so as to determine the financial instrument corresponding to the user, and provide the financial instrument to the user.

Specifically, the fifth determination apparatus 607 compares items in the financial need related characteristic of the user that is determined by the fourth determination apparatus 606 with items in the financial need related characteristics of the user groups, and if it is found that the differences between the items of the financial need related characteristic of the user and the items of the financial need related characteristics of the user group are all within a preset range, it can be ascertained that the user belongs to the user group, and therefore the financial instrument corresponding to the user group can be used as the financial instrument corresponding to the user.

It will be appreciated by those skilled in the art that in addition to the foregoing modes, the user group to which the user belongs may also be determined in other modes based on the concept of the present invention, and such modes shall also fall within the protection scope of the present invention, and are incorporated herein by reference.

It will be appreciated by those skilled in the art that the foregoing apparatuses 605-607 and apparatuses 601-604 are independent of each other in terms of time, that is, the operations performed by the apparatuses 605-607 do not need to immediately follow the operations of the apparatuses 601-604 in time.

It will be appreciated by those skilled in the art that the apparatuses or modules in the network device according to the embodiment described above with reference to FIG. 6 may be separate modules, or all or some of the apparatuses or modules may be integrated in a single apparatus.

It should be noted that the present invention may be implemented in software and/or a combination of software and hardware, for example, may be implemented by using an application specific integrated circuit (ASIC), a general-purpose computer or any other similar hardware device. In one embodiment, a software program of the present invention may be run by a processor to perform the steps or functions described above. Similarly, the software program (including a related data structure) of the present invention may be stored in a computer readable recording medium, such as a RAM memory, a magnetic or optical drive or floppy disk or a similar device. In addition, some steps or functions of the present invention can be implemented by using hardware, for example, as a circuit that cooperates with the processor to perform various steps or functions.

In addition, part of the present invention may be applied as a computer program product, for example, computer program instructions, which, when run by a computer, can invoke or provide the method and/or the technical solution according to the present invention by means of the computer's operation. The program instructions that invoke the method of the present invention may be stored in a built-in or removable recording medium, and/or transmitted via a data stream in a broadcast or other signal bearing medium, and/or stored within a memory within the computer device operating according to the program instructions. Herein, an apparatus is provided according to one embodiment of the present invention, where the apparatus includes a memory configured to store computer program instructions and a processor configured to run the program instructions. When the computer program instructions are run by the processor, the apparatus is triggered to perform the method and/or the technical solution according to the foregoing embodiments of the present invention.

It should be evident to those skilled in the art that the present invention is not limited to the detailed description of the foregoing exemplary embodiments, and the present invention may be embodied in other specific forms without departing from the spirit or essential characteristics of the present invention. The above described embodiments are to be considered in all respects only as illustrative, but not restrictive. Therefore, the scope of the present invention is defined by the appended claims but not by the above description. All equivalents to the claims and modifications made within the claims should fall within the scope of the present invention. Reference marks in the claims should not be construed as limiting the related claims. In addition, it would be obvious that the term "comprising" does not exclude other elements or steps, and the singular does not exclude the plural. A plurality of units or apparatuses described in the system claims may also be implemented by one unit or apparatus via software or hardware. The terms such as first and second are used to represent names, but are not intended to imply any particular order.

The invention claimed is:

1. A method for financial data mining, comprising:
   acquiring, by a network device comprising a set of rules for determining user attentions of financial instruments on the Internet, search behavior information of a plurality of users from a plurality of user devices;
   determining, by the network device using the set of rules, based on the search behavior information of the plurality of users, financial instruments corresponding to search behaviors of the plurality of users, wherein the financial instruments include a financial product or financial information, and the search behaviors include search inputs to the plurality of user devices;
   determining, by the network device, based on the determined financial instruments corresponding to the search behaviors of the plurality of users, user attention information corresponding to each of the determined financial instruments, wherein the user attention information corresponding to each of the determined financial instruments includes a number of attentions of the users paid to the each determined financial instrument, and the number of attentions being determined based on statistics of the financial instruments corresponding to the search behaviors, wherein the number of attentions of the users paid to the each determined financial instrument is acquired based on a number of search behaviors being acquired from the plurality of user devices and determined as having a financial need for the each determined financial instrument; and
   publishing, by the network device over a network, on an information publishing platform, the user attention information corresponding to each of the determined financial instruments, the user attention information published on the information publishing platform being accessible by the plurality of user devices, wherein the search behaviors having the financial need for a given user is determined by:
   acquiring n search behaviors of the given user arranged in chronological order, n being a positive integer greater than 1;
   acquiring an initial financial need value of each of the n search behaviors, the initial financial need value being determined by a keyword in the each search behavior or a page accessed by the each search behavior; and
   determining whether the $n^{th}$ search behavior has a financial need based on a final financial need value $D(n)'$, wherein $D(n)'=(1+f(D(n-1))\times a)\times D(n)$, wherein $D(n-1)$ is the initial financial need value of the $(n-1)^{th}$ search behavior of the given user, $D(n)$ is the initial financial need value of the $n^{th}$ search behavior of the given user, a is a weight value, $f(D(n-1))=1$ when $D(n-1)$ is greater or equal to a preset threshold T, and $f(D(n-1))=0$ when $D(n-1)$ is smaller than the preset threshold T.

2. The method according to claim 1, wherein the determining, based on the search behavior information of the plurality of users, the financial instruments corresponding to the search behavior of the plurality of users comprises:
   determining, based on the search behavior information of the plurality of users, a financial instrument corresponding to each search behavior of the plurality of users having the financial need.

3. The method according to claim 2, wherein the determining, based on the search behavior information of the plurality of users, the financial instrument corresponding to each search behavior of the plurality of users having the financial need comprises:
   determining, by performing an initial need analysis of the search behavior information of the plurality of users, the search behavior of the plurality of users having the financial need; and
   determining, by analyzing information regarding the determined search behavior of the plurality of users having the financial need, the financial instrument corresponding to each search behavior of the plurality of users having the financial need.

4. The method according to claim 2, wherein the determining, based on the search behavior information of the plurality of users, the financial instrument corresponding to each search behavior of the plurality of users having the financial need comprises:

determining, by analyzing the search behavior information of the plurality of users, the financial instrument corresponding to each search behavior of the plurality of users; and determining, by performing an initial need analysis of the search behavior information of the plurality of users, the search behavior of the plurality of users having the financial need, so as to determine the financial instrument corresponding to each search behavior of the plurality of users having the financial need.

5. The method according to claim 4, wherein the determining, by performing the initial need analysis of the search behavior information of the plurality of users, the search behavior of the plurality of users having the financial need comprises at least one of the following modes:

performing a semantic analysis of a query sequence in each search behavior of the plurality of users, to determine whether the search behavior has the financial need;

analyzing content in a page opened in response to each search behavior of the plurality of users, to determine whether the search behavior has the financial need; and determining whether the search behavior has the financial need through an attribute of a website opened in response to each search behavior of the plurality of users.

6. A method for providing financial instrument information to users, the method comprising:

acquiring, by a network device, search behavior information of a plurality of users from a plurality of user devices;

determining, by the network device, financial need related characteristics of the plurality of users based on the search behavior information of the plurality of users, wherein the determining financial need related characteristics of the plurality of users comprises determining a user having a financial need from the plurality of users, the determining the user having the financial need comprises:

acquiring n search behaviors of the user arranged in chronological order, n being a positive integer greater than 1, acquiring an initial financial need value of each of the n search behaviors, the initial financial need value being determined by a keyword in the each search behavior or a page accessed by the each search behavior, and determining whether the $n^{th}$ search behavior has a financial need based on a final financial need value $D(n)'$, wherein $D(n)'=(1+f(D(n-1))\times a)\times D(n)$, wherein $D(n-1)$ is the initial financial need value of the $(n-1)^{th}$ search behavior of the user, $D(n)$ is the initial financial need value of the $n^{th}$ search behavior of the user, a is a weight value, $f(D(n-1))=1$ when $D(n-1)$ is greater or equal to a preset threshold T, and $f(D(n-1))=0$ when $D(n-1)$ is smaller than the preset threshold T;

determining, by the network device, the search behavior as the search behavior having the financial need in response to $D(n)'$ being greater than a threshold;

grouping, by the network device, the plurality of users into a plurality of user groups according to the determined financial need related characteristics of the users, wherein each of the user groups has a corresponding financial need related characteristic;

determining, by the network device, a financial instrument corresponding to each of the user groups by matching the financial need related characteristic of each of the user groups with instrument characteristics of a plurality of financial instruments;

determining, by the network device, based on the determined financial instrument corresponding to each of the user groups, user attention information corresponding to each of the determined financial instrument, wherein the user attention information corresponding to each of the determined financial instrument includes a number of attentions of the users paid to the each determined financial instrument, the number of attentions being determined based on statistics of the financial instruments corresponding to the search behaviors, wherein the number of attentions of the users paid to the each determined financial instrument is acquired based on a number of search behaviors being acquired from the plurality of user devices; and publishing, by the network device over a network, on an information publishing platform, the determined financial instrument and the user attention information corresponding to each of the user groups, the determined financial instrument and the user attention information published on the information publishing platform being accessible by a plurality of network devices.

7. The method according to claim 6, further comprising:
acquiring the search behavior information of a given user;
determining a financial need related characteristic of the user based on the search behavior information of the user; and
determining a user group to which the user belongs based on the financial need related characteristic of the user and the determined financial need related characteristics of the plurality of user groups, so as to determine the financial instrument corresponding to the user.

8. The method according to claim 6, wherein the determining the financial need related characteristics of the users based on the search behavior information of the users comprises:

selecting users having the financial need by performing an initial need analysis of the search behavior information of the plurality of users; and
determining the financial need related characteristics of the users based on the search behavior of the user having the financial need.

9. The method according to claim 6, wherein the determining the financial need related characteristics of the users based on the search behavior of the user comprises:
determining the financial need related characteristics of the users based on the search behavior of the user in combination with a natural attribute of the users.

10. The method according to claim 9, wherein the natural attribute of the user comprises at least one of the following: an age of the user, a gender of the user, an occupation of the user, a consumption level of the user, and a geographical location of the user.

11. An apparatus for financial data mining, comprising:
at least one processor; and
a memory storing instructions and a set of rules for determining user attentions of financial instruments on the Internet, wherein the instructions when executed by the at least one processor, cause the at least one processor to perform operations, the operations comprising:
acquiring search behavior information of a plurality of users from a plurality of user devices;

determining, using the set of rules, based on the search behavior information of the plurality of users, financial instruments corresponding to search behaviors of the plurality of users, wherein the financial instruments include a financial product or financial information, and the search behaviors include search inputs to the plurality of user devices; and determining, based on the determined financial instrument corresponding to the search behaviors of the plurality of users, user attention information corresponding to each of the determined financial instruments, wherein the user attention information corresponding to each of the determined financial instruments includes a number of attentions of the users paid to the each determined financial instrument, and the number of attentions being determined based on statistics of the financial instruments corresponding to the search behaviors, wherein the number of attentions of the users paid to the each determined financial instrument is acquired based on a number of search behaviors being acquired from the plurality of user devices and determined as having a financial need for the each determined financial instrument; and publishing over a network, on an information publishing platform, the user attention information corresponding to each of the determined financial instruments, the user attention information published on the information publishing platform being accessible by a plurality of the plurality of user devices, wherein the search behaviors having the financial need for a given user is determined by:

acquiring n search behaviors of the given user arranged in chronological order, n being a positive integer greater than 1;

acquiring an initial financial need value of each of the n search behaviors, the initial financial need value being determined by a keyword in the each search behavior or a page accessed by the each search behavior; and determining whether the $n^{th}$ search behavior has a financial need based on a final financial need value $D(n)'$, wherein $D(n)'=(1+f(D(n-1))\times a)\times D(n)$, wherein $D(n-1)$ is the initial financial need value of the $(n-1)^{th}$ search behavior of the given user, $D(n)$ is the initial financial need value of the $n^{th}$ search behavior of the given user, a is a weight value, $f(D(n-1))=1$ when $D(n-1)$ is greater or equal to a preset threshold T, and $f(D(n-1))=0$ when $D(n-1)$ is smaller than the preset threshold T.

12. An apparatus for providing financial instrument information to users, comprising:

at least one processor; and a memory storing instructions, wherein the instructions when executed by the at least one processor, cause the at least one processor to perform operations, the operations comprising:

acquiring search behavior information of a plurality of users from a plurality of user devices;

determining financial need related characteristics of the users based on the search behavior information of the plurality of users, wherein the determining financial need related characteristics of the plurality of users comprises determining a user having a financial need from the plurality of users, the determining the user having the financial need comprises:

acquiring n search behaviors of the user arranged in chronological order, n being a positive integer greater than 1, acquiring an initial financial need value of each of the n search behaviors, the initial financial need value being determined by a keyword in the each search behavior or a page accessed by the each search behavior, and determining whether the $n^{th}$ search behavior has a financial need based on a final financial need value $D(n)'$, wherein $D(n)'=(1+f(D(n-1))\times a)\times D(n)$, wherein $D(n-1)$ is the initial financial need value of the $(n-1)^{th}$ search behavior of the user, $D(n)$ is the initial financial need value of the $n^{th}$ search behavior of the user, a is a weight value, $f(D(n-1))=1$ when $D(n-1)$ is greater or equal to a preset threshold T, and $f(D(n-1))=0$ when $D(n-1)$ is smaller than the preset threshold T;

grouping the plurality of users into a plurality of user groups according to the determined financial need related characteristics of the users, where each of the user groups has a financial need related characteristic;

determining a financial instrument corresponding to each of the user groups by matching the financial need related characteristic of each of the user groups with instrument characteristics of a plurality of financial instruments;

determining, by the network device, based on the determined financial instrument corresponding to each of the user groups, user attention information corresponding to each of the determined financial instrument, wherein the user attention information corresponding to each of the determined financial instrument includes a number of attentions of the users paid to the each determined financial instrument, the number of attentions being determined based on statistics of the financial instruments corresponding to the search behaviors, wherein the number of attentions of the users paid to the each determined financial instrument is acquired based on a number of search behaviors being acquired from the plurality of user devices; and publishing over a network, on an information publishing platform, the determined financial instrument and the user attention information corresponding to each of the user groups, the user determined financial instrument and the user attention information published on the information publishing platform being accessible by a plurality of network devices, wherein the search behaviors having the financial need for a given user is determined by:

acquiring n search behaviors of the given user arranged in chronological order, n being a positive integer greater than 1;

acquiring an initial financial need value of each of the n search behaviors, the initial financial need value being determined by a keyword in the each search behavior or a page accessed by the each search behavior; and determining whether the $n^{th}$ search behavior has a financial need based on a final financial need value $D(n)'$, wherein $D(n)'=(1+f(D(n-1))\times a)\times D(n)$, wherein $D(n-1)$ is the initial financial need value of the $(n-1)^{th}$ search behavior of the given user, $D(n)$ is the initial financial need value of the $n^{th}$ search behavior of the given user, a is a weight value, f(D(n−1))=1 when D(n−1) is greater or equal to a preset threshold T, and f(D(n−1))=0 when D(n−1) is smaller than the preset threshold T.

13. A computer device, comprising the apparatus for financial data mining according to claim 11.

14. A non-transitory computer readable medium, on which instruction codes are stored, wherein the instruction codes, when being executed by a computer device, enable the computer device to perform the method according to claim 1.

15. The method according to claim 1, wherein the determining, based on the determined financial instrument corresponding to each search behavior of the plurality of users, the user attention information corresponding to each of the determined financial instruments comprises:
   determining, based on the determined financial instrument corresponding to each search behavior of the plurality of users having the financial need, the user attention information corresponding to each of the determined financial instruments.

16. A computer device, comprising the apparatus for financial data mining according to claim 12.

17. A non-transitory computer readable medium, on which instruction codes are stored, wherein the instruction codes, when being executed by a computer device, enable the computer device to perform the method according to claim 6.

* * * * *